US012749505B1

(12) United States Patent
Dobrynin et al.

(10) Patent No.: US 12,749,505 B1
(45) Date of Patent: Sep. 29, 2026

(54) MAGNETO-OPTICAL KERR EFFECT READER FOR HARD DISK DRIVES

(71) Applicant: Seagate Technology LLC, Fremont, CA (US)

(72) Inventors: Alexey Dobrynin, Londonderry (GB); Andres David Barbosa Neira, Londonderry (GB); Yury Khaydukov, Londonderry (GB); Beverley Rutherford McConnell, Londonderry (GB); Kevin Anthony McNeill, Londonderry (GB); Mark Anthony Gubbins, Letterkenny (IE)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 19/226,771

(22) Filed: Jun. 3, 2025

(51) Int. Cl.
*G11B 11/105* (2006.01)
*G11B 7/005* (2006.01)
*G11B 5/00* (2006.01)

(52) U.S. Cl.
CPC ...... *G11B 7/005* (2013.01); *G11B 2005/0021* (2013.01)

(58) Field of Classification Search
CPC ......... G11B 5/00; G11B 11/10; G11B 11/115; G11B 2005/0021; G11B 5/3106; G11B 5/607; G11B 5/6088; G11B 5/3133; G11B 11/10515; G11B 11/10543; G11B 5/39; G11B 11/10539; G11B 5/02; G11B 11/10506
USPC .............................................................. 360/59
See application file for complete search history.

(56) References Cited

U.S. PATENT DOCUMENTS 8,040,760 B2 * 10/2011 Challener ............ G11B 7/1387 369/13.13

OTHER PUBLICATIONS

Bartasyte et al., "Toward High-Quality Epitaxial $LiNbO_3$ and $LiTaO_3$ Thin Fils for Acoustic and Optical Applications," Apr. 21, 2017, *Adv. Mater. Interfaces*, 4(8):1600998.
Biagioni et al., "Nanoantennas for visible and infrared radiation," Jan. 27, 2012, *Rep. Prog. Phys*, 75(2):024402.
Hayden et al., "Nanoscale avalance photodiodes for highly sensitive and spatially resolved photon detection," May 1, 2006, *Nature Mater.*, 5:352-356.
Keatley et al., "A platform for time-resolved scanning Kerr microscopy in the near-field," Dec. 1, 2017, *Rev. Sci. Instrum.*, 88(12):123708.
Loughran et al., "Enhancing the magneto-optical Kerr effect through the use of a plasmonic antenna," Feb. 19, 2018, *Opt. Express*, 26(4):4738-4750.

(Continued)

*Primary Examiner* — Nabil Z Hindi
(74) *Attorney, Agent, or Firm* — Mueting Raasch Group

(57) ABSTRACT

Described are disk drives that utilize the magneto-optic Kerr effect (MOKE) in near field to read data that has been recorded on magnetic media. When polarized light is reflected from the surface of magnetic media at a perpendicularly magnetized bit, polar MOKE results in rotation of the polarization of the light. A reader configured to analyze the polarization orientation of light reflected from recorded bits can be used to discern the states of the bits. Near-field transducers such as used in some heat-assisted magnetic recording disk drives may be used to emit polarized light that is incident on the surface of the recording medium.

20 Claims, 2 Drawing Sheets

(56) References Cited

OTHER PUBLICATIONS

Neyts, "Simulation of light emission from thin-film microcavities" Apr. 1998, *J. Opt. Sco. Am. A*, 15(4):962-971.

Zhang et al., "Advanced optical polarizers based on 2D materials," Jul. 17, 2024, *npj Nanophoton.*, 1(28):1-17.

Zhang et al., "Cavity-Enhanced Linear Dichroism in a van der Waals Antiferromagnet," Mar. 24, 2022, *Nat. Photon.*, 16(3):311-317.

* cited by examiner

MAGNETO-OPTICAL KERR EFFECT READER FOR HARD DISK DRIVES

TECHNICAL FIELD

The disclosure relates to hard disk drives and reading data in hard disk drives.

SUMMARY

In accordance with various aspects, the present disclosure describes optical readers for incorporation into disk drives, as well as disk drives that incorporate such optical readers, in which the optical reader is configured to detect states of magnetically recorded bits from a magnetic medium. The optical reader may include a light source configured to emit polarized light incident on the magnetic medium at a location of incidence (such as a recorded bit) to produce reflected light, the reflected light having a polarization state that is rotated based on a magnetization state of the magnetic medium at the location of incidence (recorded bit). The optical reader further includes a detector configured to receive the reflected light and to detect intensity of a selected polarization state of the reflected light to thereby determine the magnetization state of the magnetic medium at the location of incidence (recorded bit).

In certain aspects, the light source is a near-field transducer, such as a near-field transducer incorporated into a heat-assisted magnetic recording write transducer.

In certain aspects, the detector includes a polarization analyzer configured to filter the reflected light based on polarization state. The polarization analyzer may be, for example, an epitaxial birefringence film, an advanced optical polarizer based on 2D materials, a plasmonic depolarizer, an emission depolarizer, or an antiferromagnetic thin film exhibiting linear dichroism.

In certain aspects, the detector includes a plasmonic layer disposed on a front of a polarization analyzer. For example, the plasmonic layer may be a gold film.

In accordance with various aspects, the present disclosure describes disk drives for storing data on spinning magnetic media disks, the disk drives including an optical reader configured to read data from the spinning magnetic media disks using the magneto-optic Kerr effect in near field. In certain aspects, the disk drive is a heat-assisted magnetic recording disk drive.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
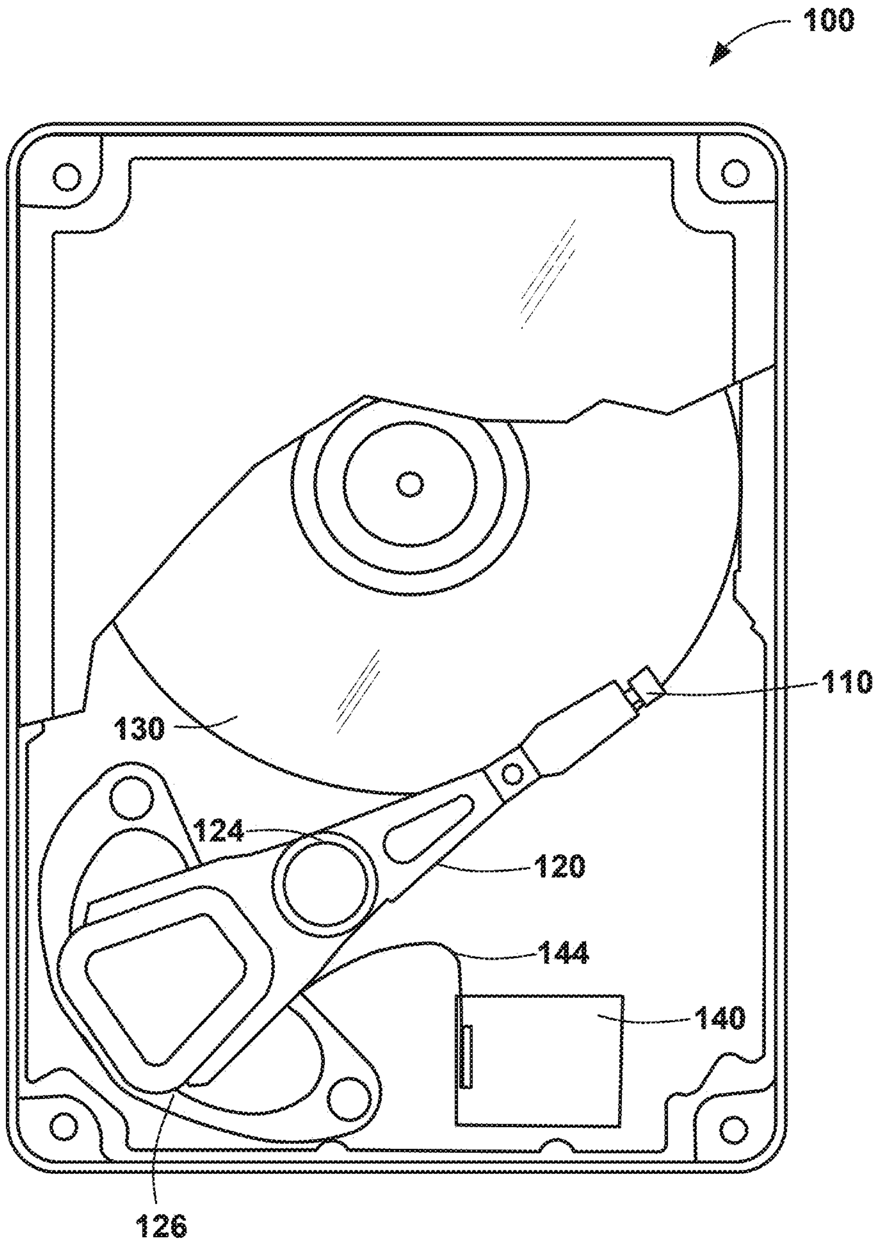
FIG. 1 is a schematic representation of certain components found in a disk drive, which may be useful in implementations according to the present disclosure.

The present disclosure relates to reading magnetically recorded data, for example data recorded on magnetic media in a hard disk drive, by configuring readers that utilize the magneto-optic Kerr effect (MOKE). Specifically, when light is reflected from a perpendicularly magnetized surface, polar MOKE results in rotation of the polarization of the light. In accordance with the present disclosure, when polarized electromagnetic radiation emitted by the near field transducer of an HDD head is incident on the surface of magnetic recording media, the polarization state of the near field light rotates upon reflection from the recording media surface depending on the magnetization state of the recorded bits. As such, a reader may be configured that includes a polarization analyzer and a photodetector to thereby detect differences in reflected polarization state, and thus to determine the states of the recorded bits. In certain embodiments, the near-field transducers found in some hard disk drives (HDDs) may be used to emit polarized light that is incident on the surface of the recording medium.

Areal density capability (ADC) in HDD recording has continued to increase due to advances in recording technologies such as heat-assisted magnetic recording (HAMR), which can greatly improve the ability to write smaller and smaller bits with a high degree of stability. HAMR utilizes electromagnetic radiation such as light from a laser diode to excite plasmonic activity in a near-field transducer (NFT). The NFT focuses and directs plasmons at the surface of a granular recording media, thereby locally heating the recording media, which reduces its coercivity and allows for the magnetic writing of stable bits that include only a few tens of grains. Current technology for reading the bits is based on tunnel magnetoresistance (TMR), which relies on a magnetic free layer rotating with respect to a reference layer, and separated by a tunneling barrier. The ability to read smaller and smaller bits with TMR readers requires size reductions in these layers that can quickly lead to increased noise and/or decreased signal, and thus a degraded signal-to-noise ratio. Therefore, the present disclosure recognizes that alternative reader solutions not involving magnetic elements may be useful in overcoming the scalability limitations of TMR readers.

In accordance with various aspects, the present disclosure is directed to reading magnetically recorded bits using nanoscale MOKE techniques. A source of polarized light can be used to direct polarized light at the recording medium surface. For example, the NFTs in HAMR HDDs may be used to produce such linearly polarized light directed at the recording medium surface. The polarization of this light is rotated upon reflection from the perpendicularly magnetized media, and the amount of rotation depends on the magnetization state of the bit from which the light is reflected. Detecting the differing amount of polarization rotation determines the state of each recorded bit. In this way, an NFT in combination with a detector that includes a polarization analyzer (such as a thin polarizer film) and a photodiode can serve as an all-optical HDD reader.

Conventional MOKE techniques are generally limited by the diffraction limit, but such physical constraints are not present in the case of near field MOKE when the incident light has a linear polarization provided by the source. Moreover, it is understood that plasmonic nano-antennas (such as NFTs) preserve linear polarization state of the incident light (defined by the laser output), unless specially designed to alter it (for example, when designed to produce circular polarization from incident linearly polarized light). In accordance with various aspects, systems and methods of the present disclosure implement polar MOKE in near field and at the nanoscale, taking advantage of the linearly polarized light emitted by NFTs that already exist for use in HAMR HDD writing. Various thin film polarization analyzers may be employed in combination with a photodiode heterostructure for effective detection of polarization rotation of the light from the NFT that is reflected from magnetically recorded bits, thereby allowing the states of the bits to be determined.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 is a schematic view of disk drive 100 including an actuation system for positioning a slider 110 over tracks of magnetic media 130. Embodiments of the present disclosure may be used with various disk drive configurations, and the particular configuration of disk drive 100 shown is illustrative and not limiting. Disk drive 100 includes voice coil motor 126 arranged to rotate actuator arm 120 on a spindle axis 124. Magnetic media 130 rotates under slider 110, which is kept aloft a small distance above the surface of magnetic media 130. Magnetic media 130 may be formatted with an array of data storage cells for storing data. In a typical HDD, recording head 110 carries magnetic transducers (not shown in FIG. 1) that are configured for reading and writing of data in tracks on the magnetic media 130. In HAMR drives, the magnetic write transducer utilizes additional electromagnetic energy to heat the surface of media 130 to facilitate recording. As such, a HAMR transducer typically includes a magnetic writer for generating a magnetic field to write to the magnetic media, and an NFT that can be activated by electromagnetic energy, such as light from a laser, to generate plasmons that are directed toward the magnetic media proximate to the magnetic write field to assist in the writing process.

In accordance with the present disclosure, the reader included in slider 110 may be an optical reader that is composed of a polarization analyzer and a photodetector. Polarized light emitted from the NFT, or polarized light emitted from another source included on the slider 110, can be directed at the surface of media 130 at a normal or near-normal incidence such that light reflected by the media 130 is directed into the optical reader. The polarization of the reflected light is rotated by an amount that depends on the magnetization state of the recorded bit on which the polarized light is incident and from which light is reflected toward the optical reader. Thus, the intensity of the reflected light that is transmitted through the polarization analyzer of the optical reader will be different for different recorded bit states. A photodetector such as a photodiode may be used to sense the intensity of the light transmitted by the polarization analyzer to thereby determine the bit states.

Disk drive 100 includes a controller 140 that is configured to provide data to and receive data from a host device through an interface (not shown). Controller 140 is coupled to the actuator arm 120 via flex cable 144 to thereby establish communications between the controller 140 and the read and write elements included on slider 110, along with signal conditioning circuitry such as a preamp (not shown). Controller 140 may also control the spinning of media disks 130 and the operation of voice coil motor 126. Disk drive 100 may be enclosed in a sealed housing and filled with a desired gas or mixture of gases, for example a mixture that primarily includes an inert gas such as helium.

Figure 2A:
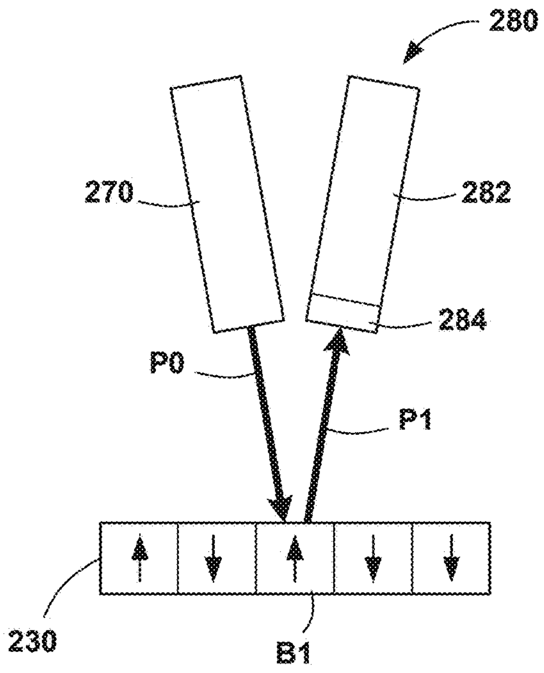
FIGS. 2A and 2B schematically illustrate the function of a magneto-optical Kerr effect reader in accordance with aspects of the present disclosure.
Figure 2B:
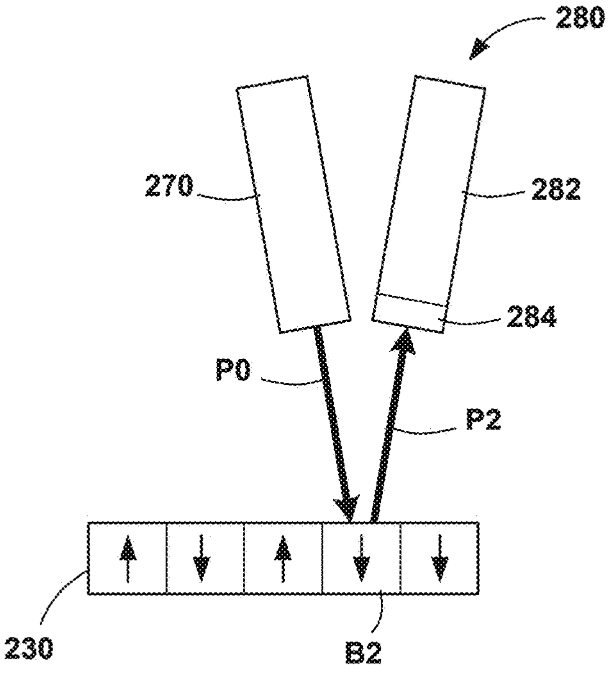

FIGS. 2A and 2B schematically illustrate the operation of a MOKE reader in accordance with aspects of the present disclosure. In reference to a magnetic storage medium 230 in which data is stored as perpendicular bits (that is, in an “up” state or a “down” state that represent binary 1s and 0s), linearly polarized low intensity light P0 is emitted by a polarized light source 270 (for example, an NFT of a HAMR recording head), at an angle close to the media normal. It will be recognized that the relative positioning of the elements in FIGS. 2A and 2A has been exaggerated for the purposes of illustration. The incident polarized light P0 is reflected into detector 280 (also referred to as a receiver or sensor), which may be composed of a polarization analyzer 284 (to filter light based on polarization state) and a photodetector 282 (to detecting the intensity of the light transmitted by the polarization analyzer 284).

In FIG. 2A, polarized light P0 is incident on the media 230 at bit B1, which happens to be an up-bit. Due to the polar MOKE effect, the reflected light P1 has a polarization state that is rotated by a first amount relative to incident light P0. A portion of reflected light P1 is transmitted by polarization analyzer 284 to the detector 283, which detects a first intensity. In FIG. 2B, polarized light P0 is incident on the media 230 at bit B2, which happens to be a down-bit. Due to the polar MOKE effect, the reflected light P2 has a polarization state that is rotated by a second amount relative to incident light P0, and different from reflected light P1. A portion of reflected light P2 is transmitted by polarization analyzer 284 to the detector 283, which detects a second intensity. Because the polarizations of reflected light P1 and reflected light P2 are different, the first intensity of light detected by the detector is different than the second intensity of light detected by the detector, thus distinguishing reflected light P1 from reflected light P2. In this way, the state of each recorded bit can be determined.

As illustrated in FIGS. 2A and 2B, the light reflected at each magnetized bit will have a rotated angle of polarization due to the MOKE effect. In particular, when the bit polarity (up or down) has a magnetization vector that is perpendicular (or nearly perpendicular) to the reflection surface, and thus parallel to the plane of incidence, the effect is called the polar Kerr effect (or polar MOKE). As such, when incorporated into an HDD device, the polarized light source 270 and detector 280 are configured such that incident light P0 is nearly perpendicular to the surface of media 230, and such that at least a substantial portion of the reflected light will be directed into the detector 280.

In exemplary embodiments, polarized light source 270 is the NFT of a HAMR HDD recording head. In certain aspects, the polarized light source may be a light source dedicated to producing polarized light for MOKE reading of bits. In detector 280, the photodetector 282 may be any suitable photodiode tuned to detect light emitted by light source 270. Suitable photodiodes for nanoscale applications may include avalanche photodiodes.

The polarization analyzer 284 may be any film(s) or layer(s) that provide for transmission of varying light intensity to the photodetector 282 based on polarization state. For example, the polarization analyzer 284 may be formed by growing epitaxial birefringence films (such as lithium niobate $LiNbO_3$) on top of a photodiode detector heterostructure. The polarization analyzer 284 may be an advanced optical polarizer based on 2D materials such as graphene, graphene oxide, transition metal dichalcogenides, perovskite, MXene materials, and so forth. The polarization analyzer 284 may be a plasmonic depolarizer, which may be designed to absorb one orientation of linear polarization and to transmit the perpendicular one. The polarization analyzer 284 may be an emission depolarizer, which is a thin film that emits light (for example, via fluorescence) due to excitation by the reflected light, and having an intensity proportional to the polarization orientation. The polarization analyzer 284 may be an antiferromagnetic thin film exhibiting linear dichroism, which absorbs light predominantly of one polarization, collinear with the crystal or magnetic (sub-) lattice orientation.

Moreover, it has been observed that the MOKE effect can be enhanced by near field via plasmonic effects. As such, it may be possible to improve the signal from the reflected light by adding a plasmonic layer (such as a thin gold film) on the front of the polarization analyzer 284, facing the magnetic recording medium.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A disk drive comprising:

an optical reader configured to detect states of magnetically recorded bits from a magnetic medium, the optical reader comprising:

a light source configured to emit polarized light incident on the magnetic medium at a location of incidence to produce reflected light, the reflected light having a polarization state that is rotated based on a magnetization state of the magnetic medium at the location of incidence; and a detector configured to receive the reflected light and to detect intensity of a selected polarization state of the reflected light to thereby determine the magnetization state of the magnetic medium at the location of incidence, wherein the detector comprises a polarization analyzer configured to filter the reflected light based on polarization state.

2. The disk drive of claim 1, wherein the light source is a near-field transducer.

3. The disk drive of claim 2, wherein the near-field transducer is incorporated into a heat-assisted magnetic recording write transducer.

4. The disk drive of claim 1, wherein the polarization analyzer comprises an epitaxial birefringence film.

5. The disk drive of claim 1, wherein the polarization analyzer comprises an advanced optical polarizer based on 2D materials.

6. The disk drive of claim 1, wherein the polarization analyzer comprises a plasmonic depolarizer.

7. The disk drive of claim 1, wherein the polarization analyzer comprises an emission depolarizer.

8. The disk drive of claim 1, wherein the polarization analyzer comprises an antiferromagnetic thin film exhibiting linear dichroism.

9. The disk drive of claim 1, further comprising a plasmonic layer disposed on a front of the polarization analyzer facing the magnetic medium.

10. The disk drive of claim 9, wherein the plasmonic layer comprises a gold film.

11. An optical reader for incorporation into a recording head of a disk drive, the optical reader comprising:

a near-field transducer configured to emit polarized light at an angle of incidence that is perpendicular to nearly perpendicular to a surface of a magnetic recording medium placed proximate to the recording head; and a detector configured to receive light reflected from the magnetic recording medium placed proximate to the recording head, and further configured to analyze a polarization state of the received light to thereby determine a magnetization state of the magnetic medium, wherein the detector comprises a polarization analyzer configured to filter the reflected light based on polarization state.

12. The optical reader of claim 11, wherein the polarization analyzer comprises an epitaxial birefringence film, an advanced optical polarizer based on 2D materials, a plasmonic depolarizer, an emission depolarizer, or an antiferromagnetic thin film exhibiting linear dichroism.

13. The optical reader of claim 10, further comprising a plasmonic layer disposed on a front of the polarization analyzer facing the magnetic medium.

14. The optical reader of claim 13, wherein the plasmonic layer comprises a gold film.

15. The disk drive of claim 1, wherein the detector further comprises a photodetector configured to detect light transmitted by the polarization analyzer.

16. The disk drive of claim 1, wherein the light source is configured to emit linearly polarized light toward the magnetic medium.

17. The disk drive of claim 5, wherein the 2D materials comprise graphene, graphene oxide, transition metal dichalcogenides, perovskite, or MXene materials.

18. The disk drive of claim 6, wherein the plasmonic depolarizer is configured to absorb a first orientation of linear polarization and to transmit a second orientation of linear polarization perpendicular to the first orientation.

19. The disk drive of claim 7, wherein the emission depolarizer comprises a thin film configured to emit light in response to excitation by the reflected light, the emitted light having an intensity proportional to polarization orientation of the reflected light.

20. The disk drive of claim 8, wherein the antiferromagnetic thin film is configured to absorb light predominantly of one polarization collinear with a crystal orientation or magnetic orientation of the antiferromagnetic thin film.

* * * * *